(No Model.)
J. L. KENNEDY.
PIPE FASTENER.
No. 551,931. Patented Dec. 24, 1895.
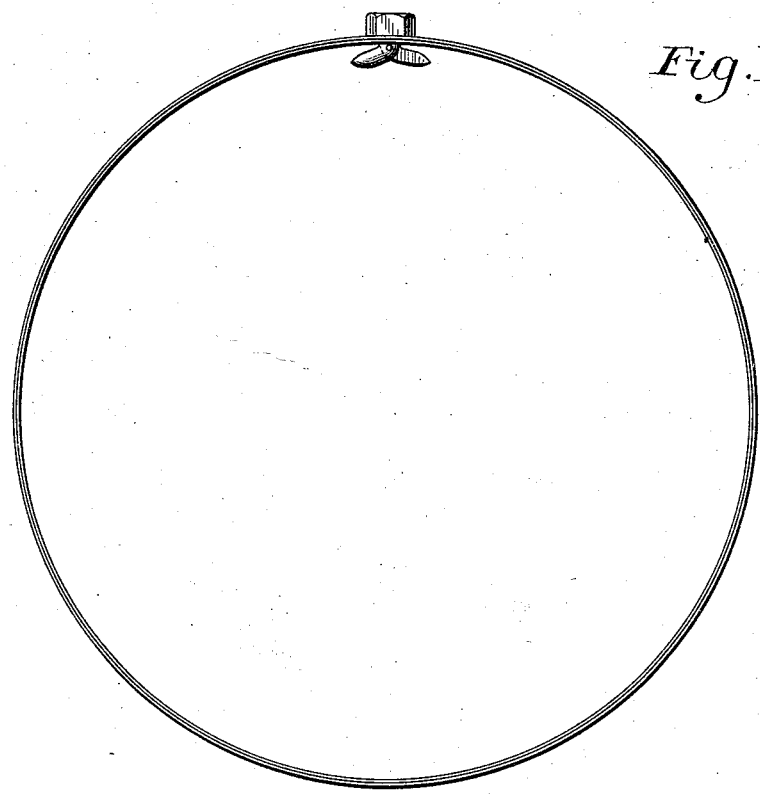
Fig. 1.
Fig. 2.
Fig. 3.
Witnesses:
Isaac F. Travis.
Arthur H. Jones
Inventor:
James L. Kennedy

UNITED STATES PATENT OFFICE.

JAMES L. KENNEDY, OF WEEPING WATER, NEBRASKA.

PIPE-FASTENER.

SPECIFICATION forming part of Letters Patent No. 551,931, dated December 24, 1895.

Application filed February 21, 1895. Serial No. 539,233. (No model.)

*To all whom it may concern:*

Be it known that I, JAMES L. KENNEDY, a citizen of the United States, residing at Weeping Water, in the county of Cass and State of Nebraska, have invented a new and useful Pipe-Fastener, of which the following is a specification.

The object of my invention is to provide a durable fastener for fastening together stove-pipe and other metal joints.

The accompanying drawings illustrate my invention.

Figure 1 shows a full-sized fastener attached to two joints of pipe; Fig. 2, the fastener detached; Fig. 3, the nut.

The fastener is made in halves and pivoted together, permitting it to be opened and closed, as shown in Figs. 1 and 2. Each half is bent nearly at right angles in opposite directions, as shown in Fig. 2. The ends thus bent are smaller than the balance of the fastener, thereby forming shoulders on the parts above the angles, as shown in Fig. 2. The halves are pivoted together at their angles, as shown in Figs. 1 and 2. A thread is provided on the shouldered ends, as shown in Fig. 2. A nut is provided, as shown in Fig. 3, and the same is adapted to engage the threads, as shown in Fig. 1. When the fastener is opened, as shown in Fig. 2, the points may be inserted through holes provided for them in the joints to be fastened, after which the fastener may be closed and secured by the nut, thus holding the joints firmly together, as shown in Fig. 1.

Having, as I believe, fully described my invention, what I claim, and desire to secure by Letters Patent of the United States, is—

1. A pipe fastener consisting of two bars, angular in form, and pivoted together at their angles, and means for retaining two of the limbs in parallelism, whereby the other two may be made to extend in opposite directions.

2. A pipe fastener consisting of two bars, substantially semi-circular in cross section, and angular in form, pivoted together at their angles, and means for retaining two of the limbs in parallelism, consisting of a thread thereon, and nut adapted to engage the thread, whereby the other limbs may be made to extend in opposite directions, all substantially as set forth.

JAMES L. KENNEDY.

Witnesses:
H. M. OLMSTEAD,
CHARLES V. HAY.